(12) United States Patent
Wunderlich et al.

(10) Patent No.: US 6,611,232 B1
(45) Date of Patent: Aug. 26, 2003

(54) LOCK BOX LOCATOR

(75) Inventors: Richard E. Wunderlich, Alpharetta, GA (US); Robert Stanley, Alpharetta, GA (US)

(73) Assignee: Robert L. Stanley, Alpharetta, GA (US)

( * ) Notice: Subject to any disclaimer, the term of this patent is extended or adjusted under 35 U.S.C. 154(b) by 0 days.

(21) Appl. No.: 09/917,229

(22) Filed: Jul. 27, 2001

Related U.S. Application Data
(60) Provisional application No. 60/221,105, filed on Jul. 27, 2000, and provisional application No. 60/125,030, filed on Mar. 18, 1999.

(51) Int. Cl.$^7$ .................................................. G01S 3/02
(52) U.S. Cl. ...................... 342/387; 342/457; 342/463
(58) Field of Search .................. 342/387, 457, 342/465, 463

(56) References Cited

U.S. PATENT DOCUMENTS

| | | | | |
|---|---|---|---|---|
| 4,799,062 A | * | 1/1989 | Sanderford et al. ......... | 342/450 |
| 5,365,516 A | * | 11/1994 | Jandrell ........................ | 370/18 |
| 5,513,243 A | * | 4/1996 | Kage ............................ | 379/58 |
| 5,914,671 A | * | 6/1999 | Tuttle ..................... | 340/825.54 |

* cited by examiner

Primary Examiner—Dao Phan

(57) ABSTRACT

A system for locating a vehicle among a large number of vehicles. A lock box unit is mounted on a vehicle and includes a key box for storing a vehicle key and a locator unit. The locator unit receives a polling signal from a central base station which includes an address for the particular locator unit to be located. The locator unit decodes the polling signal to determine whether the signal is includes its unique address. If the polling signal is meant for the locator unit then the locator unit transmits a spread spectrum to at least three receiving antennas. The location of the locator unit and therefore the vehicle is determined based upon time arrival data generated by the receiving antennas. The lock box unit may also include an identification device which records who accesses the key box to retrieve the vehicle key. This information is stored in a memory device. A clock may also be used to record the time of access of the key box as well as to prevent access to the key box during certain predetermined time periods.

22 Claims, 3 Drawing Sheets

LOCK BOX LOCATOR

CROSS REFERENCE TO RELATED APPLICATION

This patent application claims priority of U.S. Provisional Patent Application No. 60/221,105 entitled "Lock Box Locator" filed Jul. 27, 2000 and U.S. Nonprovisional Application No. 09/531,078 entitled "System and Method For Locating An Item From Among A Plurality of Items" filed Mar. 18, 2000 which claims priority of Provisional Application No. 60/125,030 entitled "Car Locator" filed Mar. 18, 1999.

BACKGROUND OF THE INVENTION

A large number of vehicles may be located in a particular area, such as a lot of an automobile auction facility or a large automobile dealership. Oftentimes, it is desirable to make these vehicles readily available for entry by authorized users, such as salesmen who may want to show a vehicle to a potential customer. However, it is also desirable to protect the vehicles from unauthorized access, vandalism, and theft.

To make vehicles readily accessible for entry by authorized persons, lock boxes are often used. In a typical application, lock boxes are attached to each vehicle on the lot where a vehicle key is placed inside the lock box and the lock box is locked. Master keys which open any of the lock boxes are then given to the authorized persons, such as vehicle salesmen. When a customer wants to look inside a vehicle or take it for a test drive, any sales person can unlock the box using the master key, and can remove the vehicle key so that the engine can be started and the vehicle taken for a test drive. When the sales person is through showing the vehicle, the vehicle key is placed back into the lock box and the lock box is locked to be ready for the next interested customer.

Due to the large number of vehicles on such lots and the multitude of users with access to the vehicles, it is difficult to know at any given moment the location of a particular vehicle. As a result, a great deal of time and effort can be expended locating these misplaced vehicles. In fact, hours can be spent looking for a vehicle which is no longer on the lot. In addition, it is difficult to obtain information regarding the activities of persons having access to the vehicles, such as how many vehicles did they access, which vehicles they accessed, the time of the access, etc. It is also difficult to obtain information regarding the use of the vehicles, such as how many vehicles were accessed, which vehicles were accessed the most, etc.

Prior art systems have been developed to track vehicles. However, many of these systems are directed towards tracking a single vehicle over a wide area when precisely instructed to do so. For example, several systems have been developed to track stolen vehicles. While these systems may work well for their intended purpose, they do not provide for continuous location of a plurality of vehicles within a designated area such as a vehicle lot, but typically track stolen vehicles over much larger areas, such as a city or state, after notification of the theft. In addition, such systems often rely on complex and expensive equipment such as GPS systems or cellular technology which may be cost prohibitive or inapplicable to a multitude of vehicles within a specific area. In addition, such systems do not provide information as to who accessed the vehicle.

Some systems have been developed for monitoring vehicles on a lot. U.S. Pat. No. 5,563,579 to Carter discloses a security key control system which includes a lock box mounted on a vehicle which contains a vehicle key. Unique "master" keys, each of which can open the lock box, are given to different users with each key identified with a particular person. When, a master key is used to open the lock box to obtain a vehicle key a key identification system identifies which master key was used. A transmitter within the lock box transmits the key identification to a computer via a central transceiver. The identity of the user of the master key can then be determined by identifying the user associated with that particular master key. To identify a vehicle, a separate transmitter periodically transmits a vehicle identification number to a central transceiver and computer. Alternatively, a passive transponder is concealed within the vehicle which, upon receiving an energized signal from the lock box, broadcasts a vehicle identification number which the lock box transmitter relays to a master transceiver through pole units on the lot.

While fit for its purpose, the Carter patent does not provide continuous accurate location information of vehicles on a very large lot. In addition, the system requires multiple transmitters for each vehicle and the use of multiple pole receivers to relay messages to the central transceiver as well as a key identification device for identifying the master key used to open the lockbox.

U.S. Pat. No. 5,801,618 to Jenkins discloses a vehicle alarm and lot monitoring system which monitors a plurality of vehicles congregated together on a lot. A transponder is hidden in each vehicle and connected to the vehicle's battery. A particular vehicle is located on the lot by transmitting a vehicle location signal, including a unique identification code for the particular vehicle sought, which is received by the hidden transponder. After receipt of the signal, the vehicle's horn, lights, alarm, etc. is energized to assist in locating the vehicle.

While fit for its intended purpose, the Jenkins patent does not provide for the continuous accurate location of each vehicle on the lot. In addition, it does not give the accurate positional location, i.e., the geospatial location of the vehicle on the lot or record the vehicle's locations, but merely assists a user in finding a particular vehicle on a lot by honking the horn, flashing lights, etc. which, especially on very large lots, may be insufficient for a user to locate the vehicle.

Having accurate vehicle location information of each vehicle on a large vehicle lot would not only assist a person in locating a particular vehicle, but would allow for notification that a vehicle is not on the lot at all. For example, the vehicle could be out for a test drive, having maintenance performed, or even stolen. In any case, to know that the vehicle is not on the lot will save the sales person a lot of frustration searching for a vehicle which is not on the lot. Accurate vehicle location will also help provide valuable information regarding the activities of persons accessing the vehicles, such as salesmen, as well as information regarding the use of the vehicles themselves.

Thus, there is a need for a simple, convenient, and inexpensive method and system for accurately locating vehicles on a large lot. There is also a need for a method which continuously provides accurate vehicle location with low power usage to allow for the tracking of vehicle over extended time periods without the need to frequently change batteries. There is also a need for a system and method which provides information as to the access of vehicles on a large lot.

BRIEF SUMMARY OF THE INVENTION

The present invention provides a unique combination of technologies which allows for the inexpensive and accurate location of vehicles on a large lot and the gathering of valuable information as to the access of the vehicle. The synergistic aspects of the combination of technologies allows for a system which can track a multitude of vehicles over a predetermined area with low power requirements such that the system can operate over extended periods due to the resulting extended battery life. The low cost and long term tracking abilities makes the system practical for large vehicle lots and avoids the need for frequent battery replacement.

A lock box unit is attached to each of a plurality of vehicles on a vehicle lot. Each lock box unit includes a lockable key box which serves as a storage compartment for storing a key for a vehicle. A lock box unit also includes a locator unit which provides for the location of the lock box unit. A locator unit receives polling signals, which include an address of the particular locator unit to be located, from a base station which transmits the polling signal using standard pager technology. The locator unit retrieves the polling signal and processes the signal protocol to determine if the address transmitted matches its own unique address, and, if so, it responds with a response signal containing its address and a data packet that includes its own unique status and alarm conditions. The response signal sent by the locator unit is a wireless RF spread spectrum transmission band that is received by at least three receiving antenna towers. The receiving antenna towers receive the locator unit transmission and relay it back to a base station computing device. The computing device measures the time-of-arrival of the signal sent by the locator unit to the receiving antennas and, measured relative to the signal sent by the locator unit, the location of the item can be determined to within approximately +/-10 feet.

The locator unit includes a paging or polling receiver, a spread spectrum transmitter, a micro-controller, an antenna, and a self contained (battery) power supply. The lock box unit may also include a motion sensor and an anti-tampering alarm to detect alarm conditions. The lock box unit may also include an identification device which obtains an identification code associated with the person accessing the key box. This identification information can either be stored in a local memory at the lock box unit or relayed to the central computer via the locator unit transmitter. A clock may also be used to record the times of entry of the lock box as well as to prevent the opening of the lock box unit during predetermined time periods such as when the vehicle lot is closed.

The lock box units are polled using standard U.S. paging technology. Thus, the responses of the lock box transmitter can be adjusted in accordance with desired battery life, security levels, etc. For instance, if it is known that a vehicle will or will not be moving, the locator unit can be polled more or less frequently.

The lock box transmitter uses spread spectrum signals for transmitting responses. This allows for the extension of battery life by allowing for lower signal strength which can still be readily understood without interference. The lock box transmitters may also transmit alarms without being polled, but may do so only during certain time slots of the protocol.

BRIEF DESCRIPTION OF THE DRAWINGS

The invention will be more readily understood from a reading of the following specification and by reference to the accompanying drawings forming a part thereof, wherein an example of the invention is shown and wherein.

DETAILED DESCRIPTION OF THE INVENTION

Referring now in more detail to the drawings, the invention will be described in more detail.

U.S. Nonprovisional Application No. 09/531,078 entitled "System and Method For Locating An Item From Among A Plurality of Items" filed Mar. 18, 2000 is incorporated herein by reference in its entirety.

Figure 1:
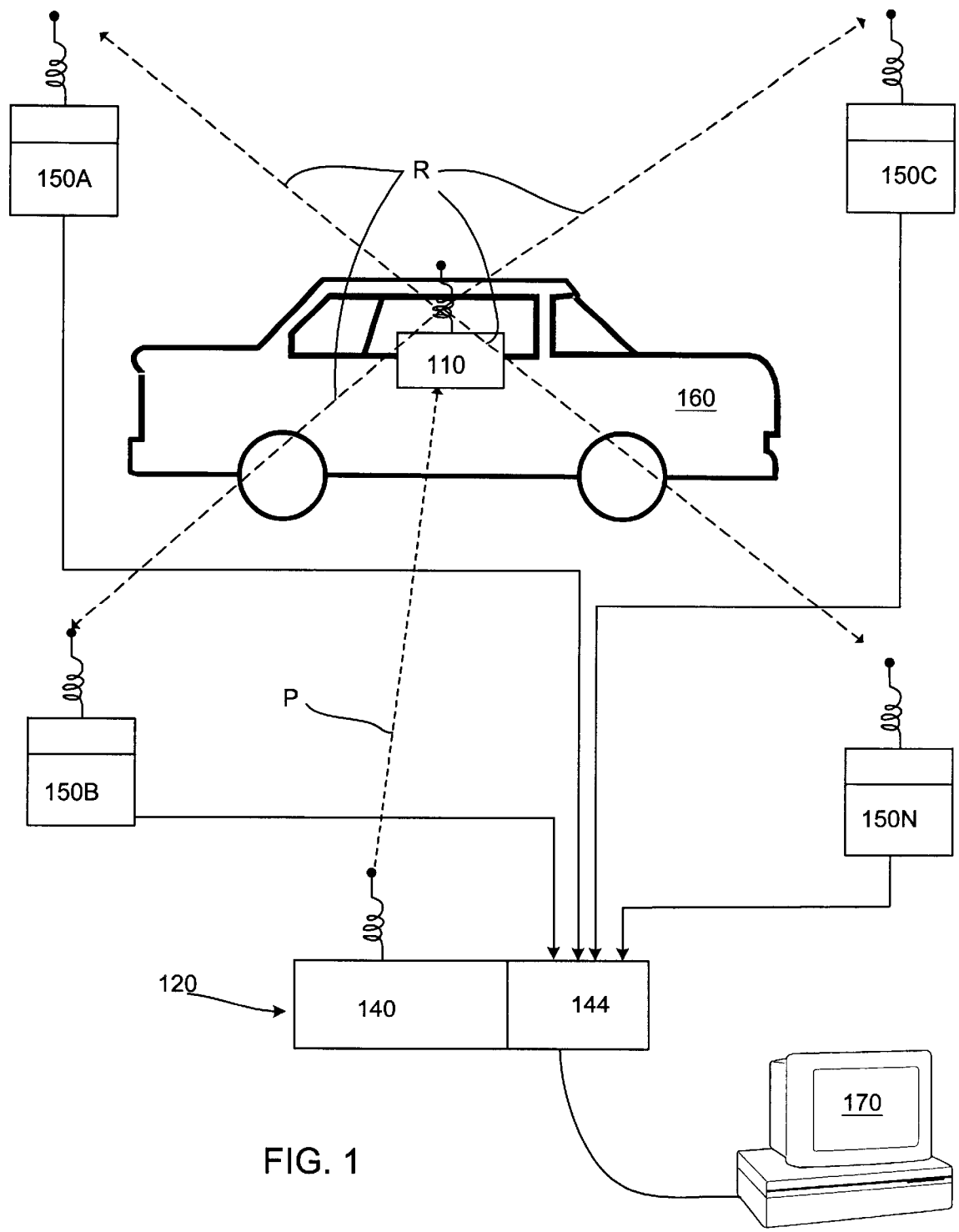
FIG. 1 shows a schematic of the system of locating a lock box of the current invention
Figure 2:
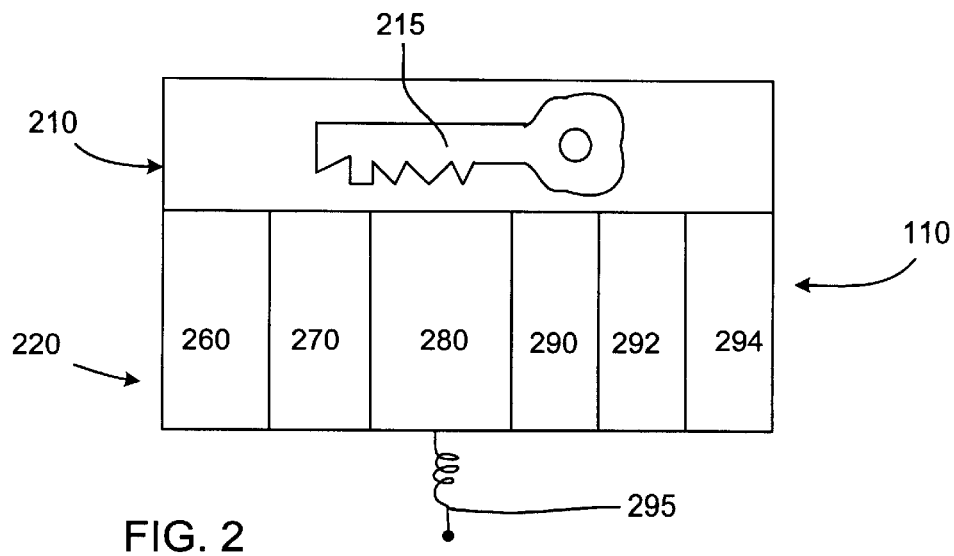
FIG. 2 shows a schematic of the lock box unit of the current invention with the locator unit and key box combined as a single unit.

As shown in FIGS. 1 and 2, the system of the current invention for locating a lock box unit 110 associated with a vehicle 160 is illustrated. The lock box unit 110 is mounted on a vehicle 160. The lock box unit 110 includes a key box 210 which stores a vehicle key 215 to the vehicle 160 to which the lock box unit is attached. The lock box unit 110 includes a locator unit 220 having a unique address which receives a polling signal P from a central base station 120. The polling signal includes an address of the particular locator unit 220 to be located. The locator unit 220 decodes the signal from the base station 120 to determine if the signal is meant for that particular lock box unit 110. If the signal is directed to the lock box unit 110 then the received instructions are carried out, such as instructions to enter a particular mode such as an alarm mode. A transmitter 280 within the locator unit 220 transmits a spread spectrum response signal R which is received by at least three receiving stations 150 (A–N) which cover the vehicle lot. The response signal R received by each receiving station 150 is then sent to the base station 120 where a computer 170 determines the location of the lock box unit 110 from time of arrival data generated by the receiving antennas 150.

As shown in FIG. 2, the lock box unit 110 comprises a key box 210 for storing a vehicle key 215. The lock box unit 110 also comprises a locator unit 220 which receives the signals from the base station 120 via the base polling transmitter 140. The lock box unit 210 may be made of various materials but should be strong enough to prevent unwanted access and should not interfere with signals to and from the locator unit 220.

The lock box unit 110 may be attached to the vehicle 160 by various methods. The lock box unit 110 may be located on the exterior of the vehicle such as by clips which extend around the top edge of the vehicle window glass such that the lock box unit 110 is held in place between the window and the vehicle 160 when the window is rolled up. This allows for entry into the vehicle when the vehicle doors are locked. The lock box unit 110 could also be located in the interior of the vehicle such as mounted on the rear view mirror. An interior location provides the lock box unit 110 with more protection from the elements.

Figure 3:
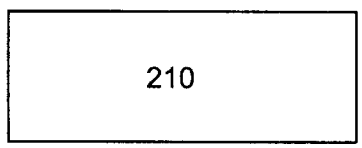
FIG. 3 shows a schematic of a separate locator unit for attachment to an existing key box.
Figure 3:
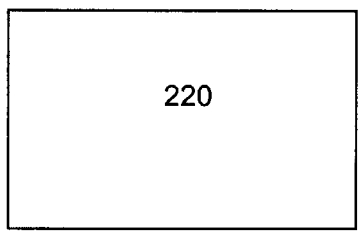

As shown in FIG. 2, the lock box unit 110 may comprise a single unit which includes both the key box 210 and the locator unit 220. The key box 210 includes a compartment for storing the vehicle key 215 which is securable by a lock which may be unlocked by any one of several master keys. The key box 210 thereby provides a secured area for keeping the keys 215 to the vehicle 160. The key box 210 may be made of various materials such as plastic which is tough and durable. On the other hand, as shown in FIG. 3, the locator unit 220 may be a retrofit for attachment to existing lock boxes already installed or employed in the field.

When a vehicle 160 is prepared for placement on the vehicle lot, a lock box unit 110 is mounted to the vehicle and the identity of the vehicle and the lock box unit 110 associated therewith is recorded in a central computer 170. For example, when a vehicle 160 is brought onto a lot a registration process takes place in which the essential characteristics of the vehicle 160 are entered into a database. At this time the vehicle 160 is fitted with the lock box unit 110 containing the locator unit 220 which has a unique address that is also entered into the database.

As shown in FIG. 1, in normal operation, a computer device 170 commands a transmitter 140 of the base station to transmit a polling signal P containing a packet to locator units 220. The base station 120 then waits for the response received by the receiving antennas 150 to be processed by the computing device 170. The period of this normal polling depends upon the number of units to be polled and the importance of battery life. For example, a normal poll mode may be about once every 5 minutes. The packet contains an address, all lock boxes having unique addresses, and control bits to configure alarm conditions and the polling period.

If a particular locator unit 220 is associated with a vehicle 160 that will start moving more often, then the packet within the polling signal P will command the locator unit 220 to expect another poll in a shorter time period, such as 30 seconds (fast poll mode), instead of the normal polling period. These are examples only, and there may be any number of polling speeds and simultaneous different polling rates. In either case, the rest of the time the locator unit 220 is in an idle condition, but always monitoring for alarms, i.e., motion or loss of power.

As shown in FIG. 2, the locator unit 220 includes a paging or polling receiver 260, a spread spectrum transmitter 280, a micro-controller 270, an antenna 295 and a self contained power supply 290, preferably a battery. The locator unit 220 may also include a motion sensor 292 an anti-tampering alarm 294.

The locator units 220 demodulates the transmitted protocol of the polling signal P, and processes the signal to determine if the address transmitted matches its own unique address, and if so responds with its address and a data packet that includes its own unique status and alarm conditions. The response signal R sent by the locator unit transmitter 280 is a wireless RF transmission (for example, in the 910–940 MHz ISM band) that must be received by at least three receiving antenna towers 150. The transmitter 280 may transmit alarms without being polled but only during certain time slots of the TDMA protocol.

The paging receiver 260 may be implemented using a commercially available FM receiver chip or chip set. The spread spectrum transmitter 280 may be implemented with a field programmable gate array and a commercially available modulator/amplifier chip. The antenna 295 serves for both transmission and reception and may consist of a single monopole. The power source 290 can be a battery of primary or secondary type, and is sized to operate for a year or more without service. The locator units 220 are small and self powered, and will report via the protocol to the computing device 170 the status of their battery life.

Figure 4:
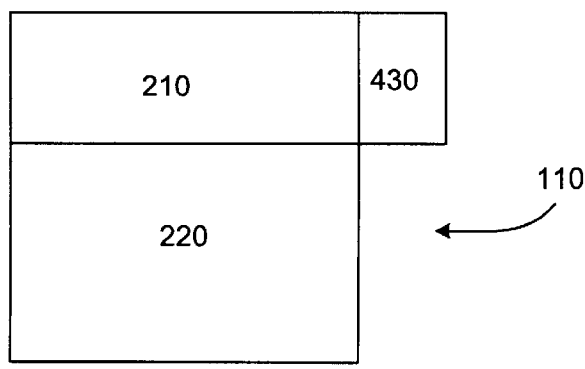
FIG. 4 shows a lock box unit of the current invention having an identification device.

As shown in FIG. 4, the lock box unit 110 may also contain an identification device 430. The identification device 430 may be a variety of known devices such as a magnetic card reader, a key pad for receiving an access code, an IR reader device, etc. The identification device 430 is used to identify the person unlocking the key box 210 by recording an identification code for the person when the key box is accessed. The identification device 430 may obtain the identification code of the user by reading a credit card, reading a code entered by the user, reading an IR input, etc. This information is then either stored locally at the lock box unit 110 or sent as part of a response signal to the central computer of the base station. This identification information may be stored in a database to track which sales people accesses to particular vehicles. The identification device may also serve as a security device which prevents access to the key box 210 to particular authorized persons.

Figure 5:
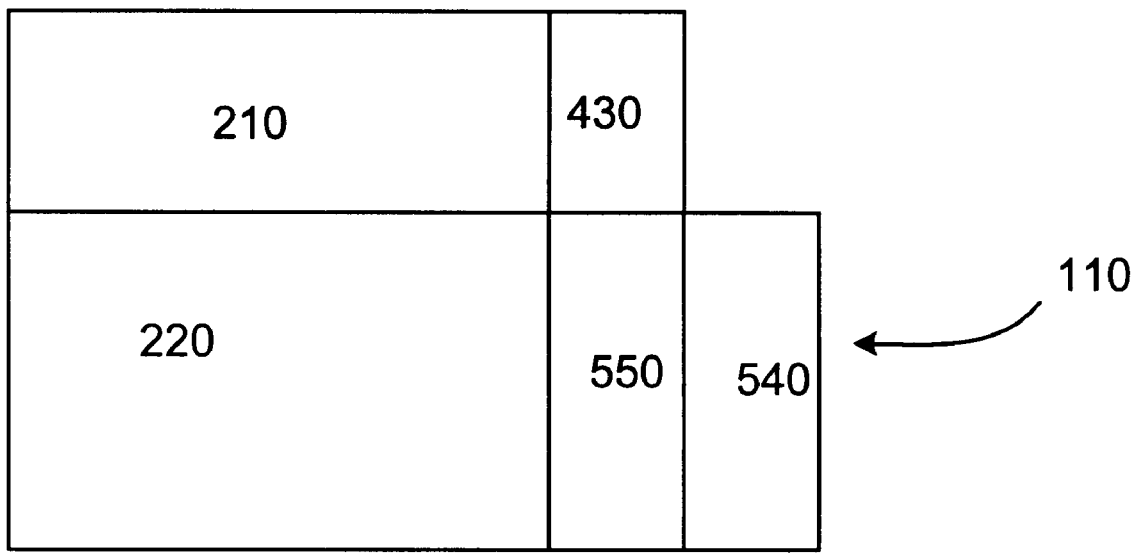
FIG. 5 shows a lock box unit of the current invention having an identification device and a local memory.

As shown in FIG. 5, the locator unit may also include a local memory 550 to store the identification data. The identification could also be transmitted to a central computer for storage. With the local memory 550 a central computer is not required to keep up with identification data and the information could then be later downloaded. The lock box unit 110 may also include a clock 540 which allows for recordation of the time of access information for the key box 210. This time of access information, coupled with the identification of the user, allows for the determination of who accessed each vehicle and when. This information may also be stored in the local memory 550 or transmitted to the central computer 170. Preferably the information is stored in a database for generating reports. The clock 540 may also be used in conjunction with the identification device 430 to prevent access to the key box during certain predetermined time periods such as after the vehicle lot is closed.

Receiving antenna towers 150 are antennas located in the receiving area that receive the locator unit 220 response signal R and relay it back to the computing device 170. The antenna towers 150 may be connected to the base station 120 by various means such as coaxial cable or an over-the-air RF link. Although at least three receiving towers 150 are required for locational determinations, more than three receiving antenna towers 150 can be installed in the receiving area to account for obstacles that would prohibit a locator unit from being able to always transmit line-of-sight from at least three towers.

The base station 120 includes a transmitter 140, a receiver 144, and an antenna 148 that is commanded by a computing device 170 to broadcast an address based protocol to a locator unit 220. To determine the location of the lock box unit 110, the computing device 170 measures the time-of-arrival of the signal sent by the locator unit 220 to the receiving antennas 150 and, measured relative to the signal sent by the locator unit 220, the location of the item can be accurately determined to within approx. +/-10 feet.

Standard U.S. paging technology is used for polling the locator units 220, and the locator units 220 use spread spectrum signals for transmitting responses. The system does not use expensive technologies such as GPS or cell phone technology. In addition, the locator units 220 are polled and do not transmit randomly. Although, the locator units 220 may transmit certain alarm conditions without being polled, they may do so only during certain time slots of the TDMA protocol. This combination of paging technology, which can be adjusted according to page less frequently to extend battery or life or more frequently to more closely track vehicles, and spread spectrum technology, which allows for low power transmissions without interference, provides an efficient, accurate, and long lasting system for locating vehicles within a predetermined area. The extension of battery life under the invention is critical to the practical implementation of a vehicle locating system for large vehicle lots.

There are multiple alarm conditions. Locator units 220 that continually do not respond to the poll containing their address are assumed (after executing a sequence of tests to minimize false alarms) by the computing device 170 to be missing or stolen. In addition to this passive form of alarm, there is an active motion alarm that can be enabled and disabled within the protocol, to allow for movement of the item during some time periods but not others.

In order to quickly process this alarm information without waiting the normal poll time period, the protocol from the base station 120 uses TDMA (Time Division Multiple Access), and periodically allows all locator units 220 in the geographical area with alarms to transmit their condition in a broadcast fashion, and continue to do so until individually polled to stop.

In between address polls of the locator units 220 and when there are no active alarms that keep the locator unit fully powered-up waiting for the next TDMA alarm slot, the locator units 220 power down to the lowest possible low power mode, with a lower power timer running that will wake the locator unit seconds or milliseconds before it expects the next address poll from the base. This greatly extends battery life of the locator unit.

The base transmitter 140 to locator unit 220 communication link uses conventional narrow band FM modulation similar to that currently used in pager technology. This link can also be implemented using a commercial paging transmitter. This same pager technology can also be embedded in the locator unit 220 as well. This technology is mature, and its use is very cost effective. Data rates which this technology is able to support range from 2400 to 9600 baud.

The reply signals from the locator units 220 are processed using time-of-arrival techniques. Each locator unit 220 has a unique address, using a sufficiently long binary field for the address to prevent addresses from being re-used (a field from 32 to 40 bits long). This allows installations of the system to coexist side-by-side and not interfere with each other's operation. Also, repair or replacement locator units 220 can be added to an installed system simply by adding their address information to the database maintained by the computing device.

The computing device 170 that originates the transmitted protocol to the locator units and subsequently receives the locator unit's poll response and alarms maintains a list of locator unit addresses in order to know which locator units 220 to poll in the geographic area. Once a locator unit 220 has responded to the computing device 170 via the receiving antenna towers 150 and the TOA (Time of Arrival) calculation has determined its location, the computing device 170 translates that information via a look-up-table or some database engine to either a serial number or description, such as a vehicle identification number, and further displays that information on a map such as on a computer screen or printed on paper that is proportionally representative of the geographical area.

The polling period in the normal mode, about 5 minutes per 'locator', coupled with the amount of time required to do a single poll results in a system that can track and locate up to thousands of vehicles within +/-10 feet within the geographical area.

While the preferred embodiments of the invention have been shown and described, it will be obvious to those skilled in the art that various modifications and alterations can be made thereto without departing from the spirit and scope of the invention as defined in the appended claims.

What is claimed is:

1. A method for locating a vehicle from among a plurality of vehicles within a predetermined area, comprising the steps of:
    attaching a lock box unit to each of said plurality of vehicles, said lock box unit comprising a locator unit and a key box for storing a vehicle key;
    transmitting a polling signal including a locator unit address for a desired locator unit to be located;
    receiving the polling signal at said desired locator unit having said locator unit address;
    transmitting a spread spectrum response signal from said desired locator unit to at least three receiving antennas; and
    determining the location of the desired locator unit based on time of arrival data generated by the receiving antennas.

2. The method of claim 1 further including the step of obtaining an identification code for tracking the access of said key box and storing said identification code in a memory.

3. The method of claim 1 further including the step of obtaining an identification code for tracking the access of said key box and transmitting said identification code to a computer for storage.

4. The method of claim 1 further including the steps of obtaining time of access information for tracking when said key box is accessed and storing said time of access information in a memory.

5. The method of claim 1 further including the steps of obtaining time of access information for tracking when said key box is accessed and transmitting said time of access information to a computer.

6. The method of claim 1 further including the steps of providing a predetermined alarm condition and transmitting an alarm signal from said locator unit if said alarm condition occurs.

7. The method of claim 6 wherein said alarm condition is a motion alarm condition.

8. The method of claim 6 wherein said alarm condition is a tamper alarm condition.

9. The method of claim 1 further including the step of preventing access to said key box during a,predetermined time period.

10. A low power system for locating a vehicle among a plurality of vehicles within a predetermined area comprising:
    a base station for transmitting a polling signal;
    a lock box unit attached to a vehicle to be located, said lock box unit comprising a locator unit for receiving said polling signal and transmitting a spread spectrum response signal if said polling signal includes a unique address of said locator unit;
    at least three receiving antennas for receiving said response signal from said locator unit; and
    a computer for determining the location of said locator unit based on time of arrival data generated by the receiving antennas.

11. The system of claim 10 wherein said lock box unit further comprises an identification device for obtaining an identification code for tracking accesses of the key box.

12. The system of claim 11 wherein said lock box unit further comprises a memory for storing said identification code.

13. The system of 10 wherein said lock box unit further comprises a clock for determining time of access information for said key box.

14. The system of claim 10 wherein said lock box unit further comprises an alarm for signaling an alarm condition.

15. The system of claim 14 wherein said alarm is a motion alarm.

16. The system of claim 14 wherein said alarm is an anti-tamper alarm.

17. A lock box unit for storing a vehicle key for access by a multitude of users, the lock box being used in a vehicle location system having a base station for emitting polling signals and receiving antennas for receiving spread spectrum signals, comprising:

a key box;

a locator unit attached to the key box, said locator unit comprising:

a paging receiver for receiving a polling signal, the signal including address information;

a spread spectrum transmitter for transmitting a signal in response to the polling signal if the address information matches the address of the lock box;

an antenna for receiving and transmitting the polling and response signals respectively; and a self contained power supply for providing power to various components of the locator unit, the components including the receiver and the transmitter; and an identification device for receiving and recording an identification code corresponding to a user accessing the lock box.

18. The lock box unit of claim 17 further comprising a memory for storing an identification code obtained by said identification device.

19. The lock box unit of claim 17 further comprising a clock for obtaining time of access information of said key box.

20. The lock box unit of claim 17 further comprising an alarm for signaling an alarm condition.

21. The method of claim 1 wherein the polling signal is an FM signal.

22. The system of claim 10 wherein the polling signal is an FM signal.

* * * * *